P. C. McMANUS.
Potato Digger.

Patented Dec. 14, 1869.

P. C. McMANUS.
Potato Digger.
No. 97,790.
2 Sheets—Sheet 2.
Patented Dec. 14, 1869.
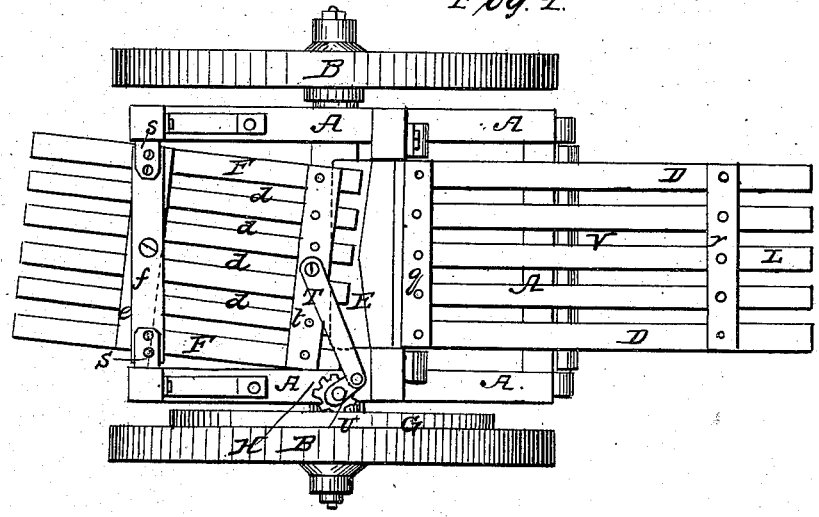
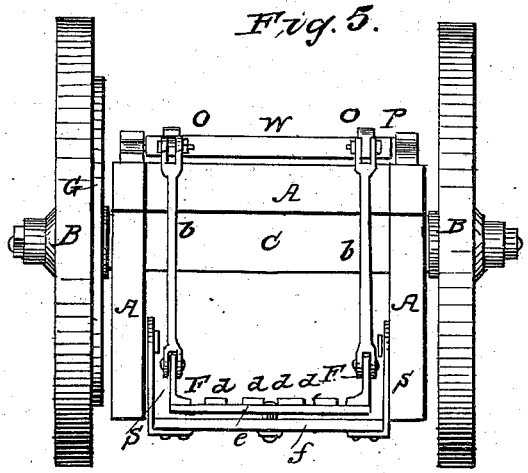
Witnesses
Inventor

United States Patent Office.

PHILIP C. McMANUS, OF TROY, NEW YORK.

Letters Patent No. 97,790, dated December 14, 1869; antedated December 7, 1869.

IMPROVEMENT IN POTATO-DIGGER.

The Schedule referred to in these Letters Patent and making part of the same.

*To all whom it may concern:*

Be it known that I, PHILIP C. McMANUS, of Troy, in the county of Rensselaer, and State of New York, have invented certain new and useful Improvements in Potato-Diggers; and I do hereby declare that the following is a full and exact description thereof, reference being had to the accompanying drawings, and letters of reference marked thereon, making part of this specification, in which—

Figure 1, Sheet A, is a perspective view of the digger;

Figure 4, Sheet B, is a view of the bottom side of the digger, and

Figure 5 is an end elevation of the rear part thereof.

The same letters refer to like parts in each of the said figures.

My said invention consists in an improved arrangement, construction, and combination of the respective parts composing the digger with reference to each other, in order to attain thereby a more perfect construction and operation thereof, all in manner substantially as hereinafter fully described and shown.

To enable others to make and use my improved potato-digger, I now proceed to fully describe its construction and operation, which is as follows:

I make a suitable frame of timber, consisting of the top side-pieces, and connecting cross-pieces A A A A and hangers therefrom, $A^1 A^1$ and $A^2 A^2$.

This frame is supported by and is secured to the axle C, which is borne by the wheels B B in manner substantially as shown in the aforesaid drawings.

The digging-part is formed of a series of bars, L, arranged on and secured to cross-bars $q$ and $r$, in about parallel positions to and separated from each other by intervening spaces, the side bars of the series being provided with vertical side-pieces D D.

The digging-ends of said series of bars are made wedge-like or pointed, and also they are made vertically thicker next the cross-bar $p$, where the greatest strain falls on the bars in digging, and from thence to their rear ends said bars gradually decrease in vertical thickness.

Figure 3:
Figure 3 is a cross-vertical section, taken at line X X of fig. 2.

The said bars L are furthermore strengthened by making their top sides in a flanged, ribbed, or angular shape, in manner substantially as shown at $c c c$ in fig. 3, which form also very much aids and facilitates the breaking and passing of lumps of soil or dirt through the interstices of the said bars.

The digging-part is attached to the frame-work hangers $A^1 A^1$ by pivots or bearings at each end of the cross-bar $q$, and their boxes affixed to the hangers in manner as shown, while the front part of the digger is suspended from the shaft V and arms M by links $a$ $a$, the said shaft V being attached to the front frame A in manner as shown.

Figure 1:
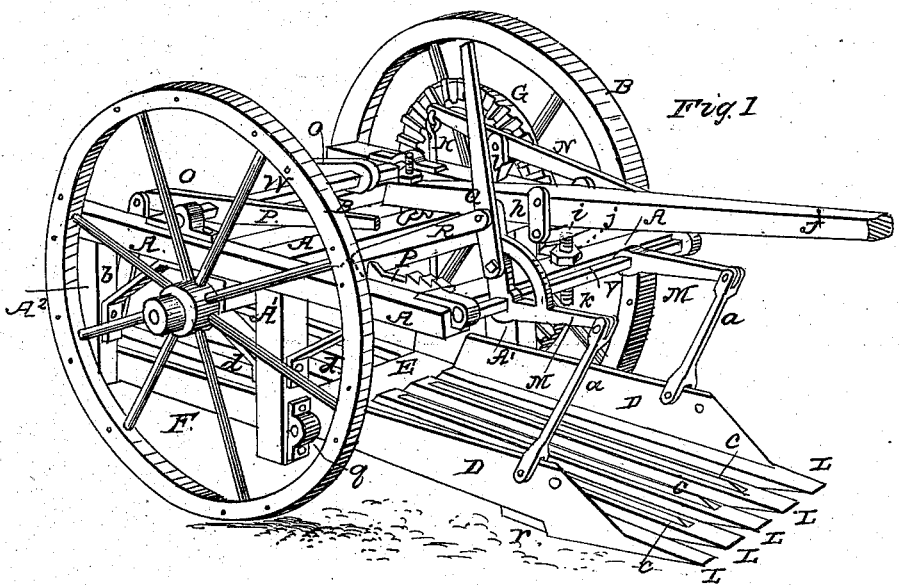

The front of the said digging-part is moved up or down, and held in adjusted position by means of the lever Q, pawl R, and ratchet $p$, arranged in manner substantially as shown in fig. 1.

Figure 2:
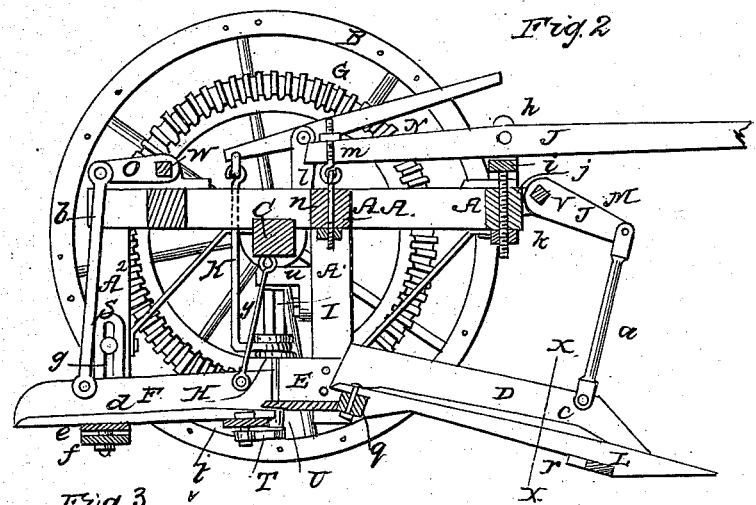
Figure 2 is a longitudinal vertical section thereof.

Below and in rear of the digger-bars L there is arranged an apron, E, which is permanently affixed to the hangers $A^1 A^1$, and so as to overlap the front end part of the sifter or riddle F, which is suspended, by means of the links Y, from the axle C, while its rear end is suspended from the arms O O, on shaft W, by the links $b$, substantially as shown in figs. 2 and 4 of the drawings.

The rear-end cross-bar $e$ of the sifter F is pivoted to a cradle or bolster, formed of the cross-bar $f$ and end-plates S S, affixed thereto, and having slots $g$ therein, so that they may slide on pins affixed to the hangers $A^2 A^2$, where the rear end of the sifter is adjusted up or down, by means of the lever P operating the arms O O and suspension-links $b$ $b$.

To the front cross-bar $t$ of the sifter F there is pivoted a connecting-arm, T, which is connected to the crank U of the pinion H, made adjustable on its shaft I, and supported in upright position by boxes $u$.

Said pinion is thrown in and out of gear with the bevel-gear wheel G, affixed to and rotating with the wheel B, by means of the clutch and rod K, operated by the lever N.

When in gear with said wheel G, the said pinion, by means of its crank and connecting-arm aforesaid, operates to give a vibratory or shaking motion to the sifter F, at and about its pivot-centre in the cross-bar $f$.

This digger is operated by attaching to the draught-pole thereof a suitable team. The driver thereof being provided with a seat on the digger-frame, rides thereon while driving the team hauling the digger, and thus directs and keeps the digger over the row of potato-hills, so that the points of the digger may penetrate and excavate in succession each hill in a row, and the potatoes and dirt or soil, by the progressive motion of the digger, are moved thereover. The lumps of soil being broken by the flanged or angular top sides of the digger-bars, mostly fall through the interstices of the said bars, while the potatoes pass on to the apron aforesaid, thence on to the sifter or riddle, whereon, by the vibratory motion thereof, they are fully cleaned of any adhering soil. The tops or vines drop through the spaces between the bars, and by the rapid motion of the sifter the potatoes are broken from the tops, and gradually pass to the rear end of the sifter, and thereat fall to the ground, or they may be received in baskets placed thereunder.

My digger comprises all the essential points necessary for a perfect, or nearly so, practical digger, little resistance in entering and passing through the earth, and elevating the same to the sifter, a rapid motion of the sifter to separate the vines and dirt from the potatoes.

The driver, in his seat, regulates the depth of the digger to the varieties of potatoes to be dug. He raises the digger, ungears and raises the sifter free from obstructions, and transports himself and machine to other fields.

It is simple in construction, compact, and not easily out of order.

The machines which have come within my knowledge are clumsy, awkward, and unphilosophic, very few embracing a good feature of operation.

Having thus described my improvements,

What I claim as my invention, and desire to secure by Letters Patent, is—

1. The arrangement of the digger D L D, the fixed apron E, and the pivoted vibrating sifter F, with reference to each other and the wheels B B, the bevel-gear wheel G, and the pinion H, in manner substantially as herein set forth and shown, for the purpose specified.

2. The combination of the ratchet $p$ and pawl R with the lever Q, shaft V, arms M M, links $a$ $a$, and digger D L D, substantially as shown, for the purpose set forth.

3. Making the bars L of the digger in a flanged, ribbed, or angular form at their top sides, substantially as herein described and shown.

4. The combination of the cradle or bolster $f$ S S, sifter F, links $b$ $b$, arms O O, shaft W, connecting-arm T, crank U, pinion H, bevel-gear wheel G, and wheel B, with each other, when arranged, with reference to the apron E and digger D L D, in manner substantially as shown, for the purpose set forth.

PHILIP C. McMANUS.

Witnesses:
 SIMON KAFKA,
 EDDY PERKIN.